Feb. 1, 1966     J. L. CROOKS     3,232,606
FILM FEEDING ARRANGEMENT
Filed March 27, 1964
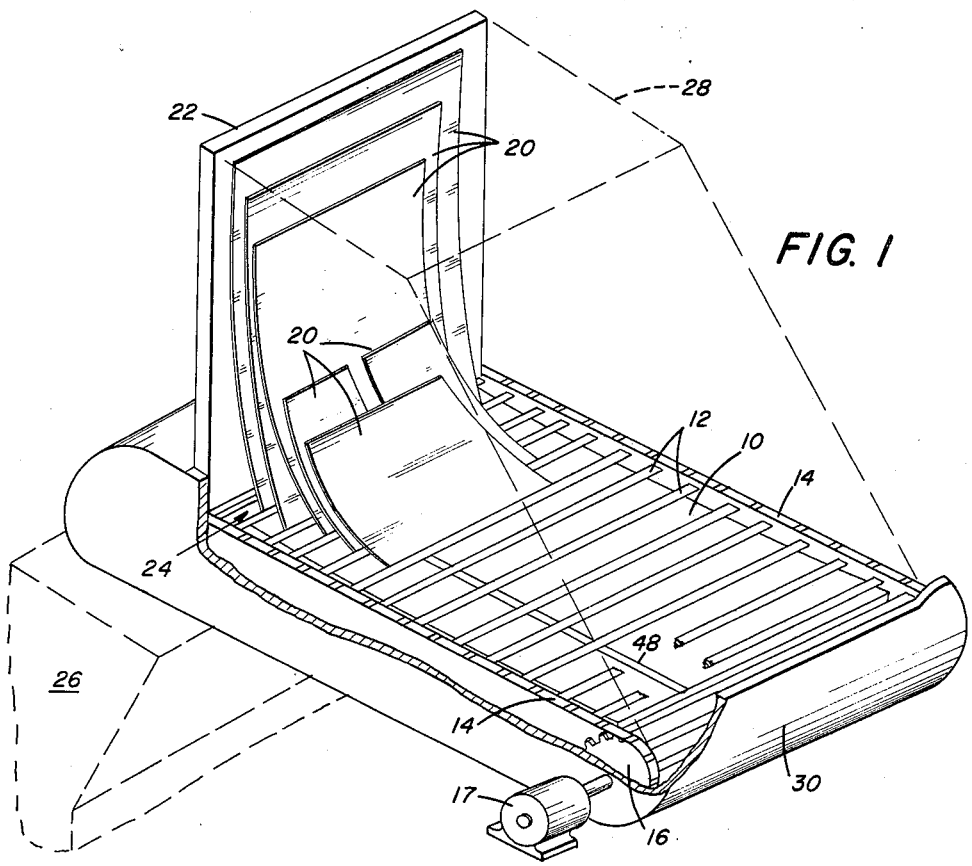
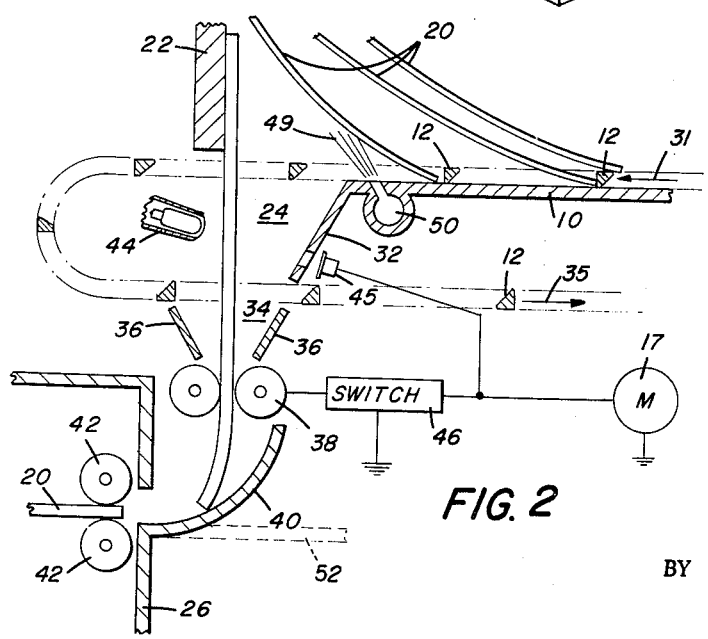
JOHN L. CROOKS
INVENTOR.
BY R. French Smith
David P. Ogden
ATTORNEYS United States Patent Office 3,232,606
Patented Feb. 1, 1966

3,232,606
FILM FEEDING ARRANGEMENT
John L. Crooks, London, England, assignor to Eastman Kodak Company, Rochester, N.Y., a corporation of New Jersey
Filed Mar. 27, 1964, Ser. No. 355,333
6 Claims. (Cl. 271—57)

The present invention relates to a film-feeding arrangement and more particularly to an arrangement which may be preloaded to automatically supply a film processing equipment with a plurality of film sheets to be developed thereby.

Several apparatus for processing film having a gelatinous coating on one or both sides are well known in the present state of the art. Apparatus of this type often takes the form of a plurality of tanks for holding developing, fixing and washing solutions and having various transport mechanisms for holding a sheet and passing it through these tanks at a predetermined rate. One of the more recent types of automatic developing machines uses self-threading roller transports whereby the film sheets move edgewise through the solutions in the tanks between pluralities of pairs of rollers which transport and guide the film through the process. Since these transport mechanisms are self-threading, they require only that an operator present film sheets one at a time so that they do not overlap to an input slot of the machine. However, the presentation of films one at a time, particularly if large films are being used, is relatively slow compared to the amount of work involved. Thus there has existed for some time a need for a film-feeding arrangement which will present films sequentially in a nonoverlapping manner to an automatic roller transport film-developing processor.

Therefore an object of my invention is to provide a new and improved film-feeding arrangement of the type particularly adapted for use in roller transport self-threading film processors.

In accordance with one embodiment of my invention a plurality of separators or tow bars are driven across a smooth bedplate or platen having in a downstream portion thereof, a lateral slot. I have also provided a guide member such that a film is raised to a substantially vertical orientation when presented to the slot and dropped therein. This slot, when positioned over the receiving slot of an automatic film processor, presents one film at a time thereto. Also, the tow bars are driven only when it is desired to present the next film sheet. Thus, the invention waits when a large piece of film is being processed and operates fairly steadily when small film sheets are being fed to the processor.

The subject matter which is regarded as my invention is particularly pointed out and distinctly claimed in the concluding portion of this specification. The invention, however, as to its organization and operation, together with further objects and advantages thereof, will best be understood by reference to the following description taken in connection with an accompanying drawing, in which:

FIG. 1 is a perspective view of one embodiment of a film feeding device of the present invention; and FIG. 2 is an elevation partly in section of a portion of the device shown in FIG. 1.

Referring to the drawing wherein like reference numbers refer to similar parts, there is shown, in FIG. 1, a platen 10 having a plurality of separators in the form of tow bars 12 driven by and attached by each end respectively to a pair of endless chains 14. The chains 14 are intermittently drivable by a pair of driving sprockets 16 mounted on a common shaft (not shown), in accordance with the operation of a driving device such as a motor 17. Sequentially accommodated among the tow bars are several sheets of film 20 which are to be developed. These sheets may be of various sizes depending on the particular use to which they are put. For instance, if they are medical X-ray film sheets, they may include chest X-rays as a large size, or X-rays of a finger, as a small size. When small size films are used of dimensions such as 3 x 5 inches, several of these films may be placed side by side in a nonoverlapping manner to be transported by a single tow bar 12. The larger film sheets are placed one resting against each bar, to be driven thereby.

At the downstream end of the platen 10 is a guide 22. This guide leans back, for example, about 10° and against the guide the upper edge of each of the film sheets 20 rest prior to being presented to a processor whereby the film sheets are moved toward a vertical orientation as they approach a region of a feed chute in the form of a slot 24 in the platen 10 adjacent to the guide 22. In the region of the slot 24, the oriented film sheets 20 will drop through the platen 10 into a processing machine indicated diagrammatically at 26 in FIG. 1.

Diagrammatically indicated in FIG. 1, is a hood or cover 28 which may be placed over the platen 10 and any film sheets thereon so that the processor 26 may be fed by the device of the present invention in ambient daylight. Obviously, the hood 28 should be coupled to a casing 30 of the platen 10, the sprockets 16 and idler sprockets (not shown), to protect undeveloped film sheets 20 from light leaks.

With the above in mind, the operation of the invention is more easily understood on referring to FIG. 2 wherein the details of the slot 24 are illustrated and the motion of the tow bars 12 over the platen 10 is indicated by an arrow 31. As the undeveloped film sheets 20 approach the guide 22 the upper end thereof rides up on the guide so that the film sheet closest thereto becomes substantially vertically oriented as discussed above in connection with FIG. 1. The lower end of the sheets being driven by the tow bars 12 come one at a time to the region of the slot 24 and drop downward over a deflector 32 so that they are guided into a slot 34 of one kind of automatic processor 26. The alignment of the tow bars 12 is arranged so that their return path, as indicated by an arrow 35, does not cause them to interfere with the film sheets 20 being presented to the processor 26. Thus a leading tow bar will pass under the deflector 32 just prior to a film sheet dropping through the slot 24 and the next tow bar will be stopped by the motor 17 before it interferes with a film sheet being processed.

By using care in designing of the cross section of bars 12, this problem may be further alleviated. For instance, use of substantially triangular sectioned tow bars, as illustrated, allows each tow bar to act as an extension of the deflector 32 whereby minimum spacing between the tow bars 12 is feasible. This slot 34 may also be provided with guide means 36 and with drive rollers 38 which present the film to the processor 26 at an acceptable velocity.

Certain processors accept film sheets horizontally even though vertical feeding is requisite. In order that the downwardly moving sheet film 20 may enter the processor horizontally, a second deflector 40 is usually provided on the processor itself whereby the film sheet 20 is guided between a first pair of drive rollers 42 within the processor 26.

Other kinds of processors have a horizontal tray indicated at 52, whereon the device may be clamped. In this case, either a deflector equivalent to that shown at 40 or the rollers 38 should be mounted offset so as to direct the sheets of film to the rollers 42.

Since an object of the present invention is to utilize the automatic processor 26 efficiently, it is preferable that the spacing between consecutive sheets is not great. Thus, it is preferred to detect the presence of a sheet in the slot 24 so that, in the absence thereof, a next sheet may be transported toward the slot 24 by the bars 12. One detection means is shown in FIG. 2 as a lamp 44 emitting radiation to which the film is not sensitive e.g. infra red radiation and a photocell detector 45 which are coupled in circuit to energize the motor 17 whenever a film sheet 20 is absent from the line of view therebetween. Quite often the rollers 38 are also provided with means which indicate the presence of two or more superimposed film sheets and a switch 46 may be adjusted to provide a signal indicative of such overlap. Obviously, other means for intermittently driving the motor 17 may be provided.

In using photocell arrangements as indicated at 45, it is preferable that the photocell 45 be placed so that it will detect the presence of a film sheet if any is being presented regardless of whether this is a wide film sheet or a narrow one using only one-half of the length of the slot 24. Therefore, if a simple photocell detector is used, care should be used in loading the device to be sure that a film sheet is placed in alignment with the photocell detector. I prefer to mark this line of the platen 10 as indicated at 48. When loading, this line 48 should always be covered by a film sheet on each tow bar. Since film-feeding arrangements are loaded in absolute or substantial darkness, I prefer that the line 48 be provided in the form of a digitally detectable surface such as a groove which may be easily located by a finger of an operator.

In some embodiments of my invention, I also prefer to provide a means for agitating the film sheets 20 in the region of the slot 24 so that they will not tend to stick to one another or bind against the guide 22. A simple means of agitation is a relatively soft air blast as indicated at 49 provided from an air supply pipe 50 lying just in front of the slot 24.

While I have shown and described particular embodiments of the present invention, other modifications may occur to those skilled in this art. I intend, therefore, to have the appended claims cover all modifications which fall within the true spirit and scope of our invention.

I claim:

1. A film sheet feeding apparatus for sequentially presenting individual film sheets to a film processor, comprising:
    a platen supported near the input of the processor in a substantially horizontal position;
    an upwardly extending guide positioned above said platen near one end thereof to define a slot therebetween;
    a plurality of spaced tow bars drivable over said platen toward said guide, said tow bars being parallel to the plane of said guide whereby film sheets, dispersed sequentially over said tow bars to be driven toward and deflected upward by said guide one layer at a time, drop substantially vertically into the slot;
    means for detecting the presence of a sheet in the slot; and
    means operable in response to said detecting means to advance said tow bars toward the slot when no film sheet is so detected.

2. A film sheet feeding apparatus as defined in claim 1 wherein said detecting means is a photocell at one side of the slot arranged to be energized by a lamp on the other side of the slot only when a film sheet does not reside therebetween.

3. A film sheet feeding apparatus as defined in claim 1 wherein means are provided for agitating the film sheets in the region of the slot.

4. A film sheet feeding apparatus as in claim 3 wherein the agitating means includes a relatively low pressure upwardly directed air jet.

5. A film sheet feeding apparatus for sequentially presenting individual film sheets to a film processor comprising:
    a pair of parallel endless chains;
    a plurality of spaced-apart parallel tow bars drivable by said pair;
    a platen lying under an upper run of said tow bars and terminating at a lateral slot at a downstream position thereof;
    an upstanding guide downstream of the slot whereby the film sheets dispersed sequentially over said platen to be pushed individually by one of said tow bars are deflected upwardly by said guide during traversal of said tow bars of the upper run toward the slot;
    a deflector for receiving each film sheet as it drops through the slot and guiding it toward a first transport means of the film processor;
    means co-operating with the slot to detect the presence of a film sheet therein; and
    means operable in accordance with a signal of said detection means to advance said tow bars toward the slot when no film sheet is detected to thus present a next film sheet to the processor.

6. A film sheet feeding apparatus as defined in claim 5 wherein said tow bars are of triangular cross section to allow closer spacing thereof without interfering with the slot area during a lower return run thereof.

References Cited by the Examiner

UNITED STATES PATENTS

| | | | |
|---|---|---|---|
| 1,511,221 | 10/1924 | Joy | 198—168 |
| 2,812,179 | 11/1957 | Gleason | 271—39 |
| 2,831,682 | 4/1958 | Gullixson | 271—62 |
| 3,149,835 | 9/1964 | Branscome | 271—62 |

M. HENSON WOOD, JR., *Primary Examiner.*

ROBERT B. REEVES, *Examiner.*